Patented Oct. 14, 1947

2,429,086

UNITED STATES PATENT OFFICE 2,429,086

AROMATIC MERCURY PHENOLATES OF HALOGENATED AROMATICS

Carl N. Andersen, Pleasantville, N. Y., assignor, by mesne assignments, to Gallowhur Chemical Corporation, a corporation of New York No Drawing. Application April 14, 1945, Serial No. 588,418

4 Claims. (Cl. 260—433)

The present invention relates to new organic mercury compounds which are characterized by possessing an aromatic mercury radical or group and a halogenated oxygenated aromatic radical or group, and in which the aromatic mercury group is linked to the rest of the molecule through an oxygen of the oxygenated group. These compounds are also characterized by desirable properties, including extraordinarily high potency as antiseptics and germicides and at the same time, relatively low toxicity.

Surprisingly indeed, it has now been found that such compounds can be prepared. This was to be unexpected in view of the high affinity of halogen for mercury and the insolubility of aromatic mercury halides. The substances of the invention fall within the general formula

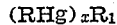

in which R represents an aromatic structure to a carbon atom of which the mercury is directly attached; in which $x$ represents a small whole number, and in which $R_1$ represents a halogenated oxygenated aromatic radical that is linked through an oxygen thereof to an RHg group. While the word "group" is used hereinafter, it is obvious that it is to be understood as plural where the value of $x$ is more than one.

More particularly, R represents an aromatic structure, which may be an aromatic nucleus with or without side chains and the expression "aromatic structure" used herein is intended to be generic and include an aromatic nucleus with or without side chains. The aromatic structure is one of the type in which none of the nuclear or side chain carbon atoms has direct linkage with any element other than hydrogen, carbon, or mercury. R may stand for the phenyl group $C_6H_5$, or for an aromatic hydrocarbon radical having a nucleus similar to the phenyl hydrocarbon radical, as for example, a polycyclic aromatic radical, in which all of the nuclear carbon atoms other than the one attached to mercury, and any side chain carbon atoms have their valences satisfied either by carbon or hydrogen. Examples are the diphenyl, tolyl, xylyl and naphthyl groups. The radical $R_1$ represents a radical corresponding to a mono or poly-hydroxy aromatic compound which also contains at least one halogen substituent. Specific representative compounds which fall within the scope of the invention are typified by compounds of the following formulae:

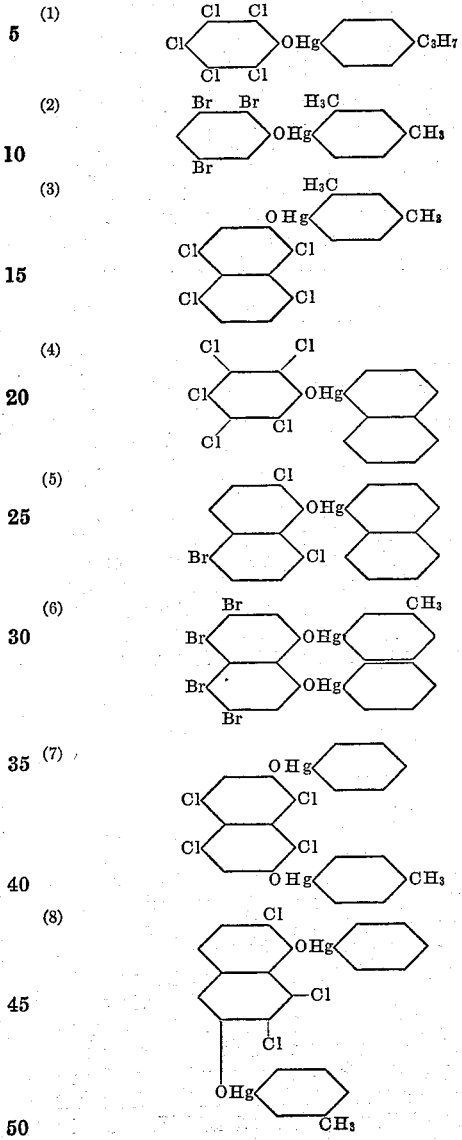

Any of the above compounds can be prepared by the general methods to be described hereinafter. The organic mercury compounds that have been prepared and tested justify the conclusion that all of the compounds of the invention have, in greater or lesser, but always in relatively high degree, desirable antiseptic and germicidal properties. The invention, therefore, is regarded as generic to and including aromatic mercury phenolates of halogenated mono or poly-phenolic compounds.

The general method of producing the new compounds consists in reacting together a halogenated mono or poly-phenolic material with a compound containing an aromatic mercury radical of the above-mentioned type. A common solvent for both reacting compounds may be employed to advantage. The compound resulting from the reaction is usually relatively insoluble as compared with the reacting components, and upon its precipitation may be filtered, washed and dried. As a compound containing an aromatic mercury radical, an aromatic mercury hydroxide, or a soluble aromatic mercury salt, such as the lactate or acetate, may be used. The aromatic mercury compounds produced are of relatively low solubility as compared with the aromatic mercury hydroxide or salt. In this reaction the structure of the halogenated phenolic residue is not disturbed and it remains intact except for the replacement of the hydroxyl hydrogen.

The following examples are given as illustrative of a method by which the compounds of the invention may be prepared and also as illustrative of some representative organic mercury compounds falling within the scope of the invention. These examples and also other specific representative compounds disclosed herein are not to be construed, however, as limitations on the invention as otherwise disclosed herein.

EXAMPLE 1

29.4 grams of phenyl mercury hydroxide was dissolved in two liters of water, heated to boiling until solution was complete, and filtered into a flask containing 21.5 grams of 2,4,5-trichlor phenol dissolved in 50 cc. of ethyl alcohol. A white precipitate formed immediately; it was insoluble in water and fairly soluble in alcohol. The mass was filtered, the precipitate was washed thoroughly with alcohol to remove any excess of trichlor phenol, and dried. After being twice recrystallized from alcohol, the product melted at 183° C. It was phenyl mercury phenolate of 2,4,5-trichlor phenol having the formula:

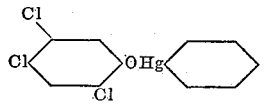

EXAMPLE 2

98 grams of phenyl mercury acetate was dissolved in 2 liters of water and heated until solution was complete and then filtered into 200 cc. of a boiling alcohol solution of 71 grams of 2,4,5-trichlor phenol. A white precipitate formed. It was insoluble in water and slightly soluble in alcohol. The mass was allowed to cool. Small crystals separated on standing. The mass was filtered, washed with alcohol and water, and recrystallized twice from ethyl alcohol. The final product obtained thereby melted at 183.2° C. It was phenyl mercury phenolate of 2,4,5-trichlor phenol having the formula:

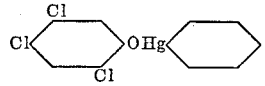

*Analysis of the phenyl mercury phenolate of 2,4,5-trichlor phenol*

|   | Theory | Found |
|---|---|---|
|   | Per cent | Per cent |
| C | 30.50 | 30.21 |
| H | 1.48 | 1.66 |
| Hg | 42.36 | 41.88 |

EXAMPLE 3

29.4 grams of phenyl mercury hydroxide was dissolved in two liters of water, and the mass heated until solution was complete. The solution was filtered into 200 cc. of an ethyl alcohol solution of 29 grams of pentachlor phenol. A dirty grey mass separated on cooling; it was interspersed with gum. The gum was removed; and on standing, a further crop of white granular crystals separated from the solution. The crystals were separated from the solution by filtering, and twice recrystallized from acetone. The final product obtained thereby melted at 194° C. It was phenyl mercury phenolate of pentachlor phenol having the formula:

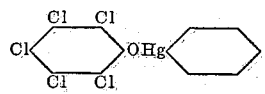

EXAMPLE 4

29.4 grams of phenyl mercury hydroxide was dissolved in two liters of water, and the mass heated until solution was complete; the solution was filtered into 100 cc. of an ethyl alcohol solution of 25.2 grams of 2,4,5-tribromophenol. Upon allowing the mass to stand, crystals separated out. The precipitate was filtered and washed with 50 cc. of ethyl alcohol phenol. After being twice recrystallized from ethyl alcohol, the final product melted at 136° C. It was phenyl mercury phenolate of 2,4,5-tribromophenol to which the following formula is assigned:

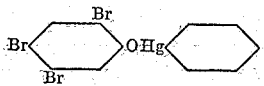

EXAMPLE 5

58.8 grams of phenyl mercury hydroxide was dissolved in 300 cc. of ethyl alcohol. When solution was complete, the solution was filtered into 100 cc. of an ethyl alcohol solution of 46 grams of 2,3,4,6-tetra-chlorphenol. Immediately on mixing the two materials, a white precipitate formed. The precipitate was filtered out, and recrystallized twice from ethyl alcohol. The final product obtained thereby melted at 185–186° C. with decomposition. It was phenyl mercury phenolate of 2,3,4,6-tetrachlorphenol and is believed to have this formula:

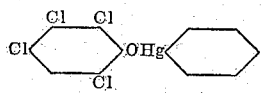

EXAMPLE 6

67.2 grams of phenyl mercury acetate was dissolved in two liters of water and heated until solution was complete. The solution was filtered into 100 cc. of an ethyl alcohol solution of 46 grams of commercial 2,3,4,6-tetrachlorphenol. A tarry, greyish precipitate resulted on mixing. The solution was decanted; a white, amorphous mass separated on cooling and appeared similar to the product of Example 5. On recrystallization twice from butyl alcohol, the product melted at 174–175° C. On further recrystallization from ethyl alcohol, the final product melted at 183–184° C. with decomposition. It was phenyl mercury phenolate of 2,3,4,6-tetrachlorphenol having the formula:

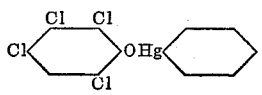

The reactant materials are employed in substantially theoretical quantities. In some cases, if desired, about 10% excess of the halogenated mono or poly-phenol is employed in order to insure the complete conversion of the phenylmercury compound.

Any suitable solvent in which the reacting components are soluble may be used as the medium for carrying out the reaction; solvents such as the alcohols or acetones or mixtures of these with each other may be employed. The process may be carried out at any temperature, for example, room temperature. In most cases it is found, however, that the application of heat facilitates the solution of the reaction components and speeds the reaction.

The aromatic mercury halogenated phenolate compounds of the invention will form at least 5% solutions in castor oil, kerosene, cyclohexanol, dichlorbenzene, pine oil, linseed oil, olive oil, perilla oil, soy bean oil, Turkey red oil, and similar fatty, hydrocarbon, or halogenated hydrocarbon oils, dioxane, ethyl carbitol, ethyl cellosolve, and similar ether-alcohols and in a mixture of isopropyl alcohol and lactic acid (solution pH of 6.0). 15% solutions thereof can be formed in cyclo-hexanol or in linoleic acid (even if the latter is diluted with kerosene or Stoddart's solvent). 10% solutions can be formed in a mixture of ¾ butyl lactate and ¼ lactic acid (even if diluted with kerosene or Stoddart's solvent).

From the description of the above specific examples, it will be readily apparent to one skilled in the art how other members of the above identified compounds may be prepared by reacting an aromatic mercury compound with a halogenated hydroxy-aromatic compound of analogous structure.

All of the compounds produced as above described are characterized by extraordinarily high potency as germicides. Tests to determine their efficacy in killing *B. typhosus* and *Staph. aureus* were carried on under the following conditions:

Aqueous solutions of varying dilutions from 1:10,000 upward until killing ceased, were made up.

These dilutions were employed in the conduct of the tests by the following methods:

Circular 198, U. S. Dept. of Agriculture, December, 1931, described as F. D. A. method against *Eberthella typhi* (typhoid bacillus) at 37° C. and F. D. A. special method against *Staph. aureus* at 37° C.

As illustrative of the potency of the compounds, the killing powers of the following compound are given, merely as illustrative.

The figures represent the maximum dilutions at which killing in 15 minutes resulted:

|  | Penicilium sp. | B. subtilis | Staph. aureus |
|---|---|---|---|
| Phenylmercury phenolate of 2,4,5-trichlor phenol | 1:47,000 | 1:35,000 | 1:90,000 |

A stock solution of phenyl mercury 2,4,5-trichlor phenolate was made by dissolving 11.80 grams thereof in 88.2 grams of butyl lactate. One gram of this solution was then diluted with 30% aqueous isopropyl alcohol to 100 grams. Eight-ounce army duck was then treated with various amounts of this material and tested. The following results were obtained:

| Run No. | Percent Compound deposited on the cloth (by weight) | F. D. A. Halos | | |
|---|---|---|---|---|
| | | Unleached | 3-hr. Spray Leached | 8-hr. Spray Leached |
| | | Mm. | Mm. | Mm. |
| 1 | 1.079 | 38 | 39 | 32 |
| 2 | 0.517 | 36 | 37 | 32 |

The organism used in this case was *Staphylococcus aureus*. It was incubated for 24 hours on a regular Petri dish. The results indicate that when the cloth is subjected to the regular 3 hour and 8 hour spray the loss is very small. When these pieces of cloth were subjected to the standard *Chaetomium globosum* and *Aspergilus niger* tests, both samples passed.

In addition to their high germicidal value, all of these compounds are characterized by relatively low toxicity. Because of these properties it is possible to use them in extreme dilutions and in many situations where known germicides, because of toxic or other undesired properties, cannot be employed. They may be used externally and locally, and in some cases administered internally with satisfactory results from the germicidal standpoints and without harmful effect to the body or its functions.

Other modes of applying the principle of the invention may be employed, change being made as regards the details described, provided the features stated in any of the following claims, or the equivalent of such, be employed.

I claim:

1. A compound of the general formula $(RHg)_xR_1$, in which, R represents a monocyclic aromatic structure to a carbon atom of which the mercury is directly attached and in which none of the carbon atoms has direct linkage with any element other than hydrogen, carbon and mercury, $x$ is a small whole number, and $R_1$ represents a halogenated oxygenated aromatic radical that is linked through a phenolic oxygen thereof to the RHg group and which is selected from the group consisting of the tri-halogenated, the tetra-halogenated and the penta-halogenated radicals.

2. A compound of the general formula $RHgR_1$, in which, R represents a phenyl radical, and $R_1$ represents a halogenated mono-oxygenated monocyclic aromatic radical that is linked through the phenolic oxygen thereof to the RHg group and which is selected from the group consisting of the tri-halogenated, the tetra-halogenated and the penta-halogenated aromatic radicals.

3. The compound, phenyl mercury 2,3,4,6-tetrachlor-phenolate.

4. The compound, phenyl mercury 2,4,5,-trichlor-phenolate.

CARL N. ANDERSEN.

REFERENCES CITED

The following references are of record in the file of this patent:

UNITED STATES PATENTS

| Number | Name | Date |
|---|---|---|
| 2,090,927 | Andersen | Aug. 24, 1937 |
| 2,240,025 | Wome et al. | Apr. 29, 1941 |
| 2,139,711 | Andersen | Dec. 13, 1938 |
| 2,139,712 | Andersen | Dec. 13, 1938 |
| 2,163,745 | Christiansen | June 27, 1939 |
| 2,177,049 | Andersen | Oct. 24, 1939 |

FOREIGN PATENTS

| Number | Country | Date |
|---|---|---|
| 329,987 | Great Britain | May 26, 1930 |

OTHER REFERENCES

Hart et al., "Jour. Am. Chem. Soc.," vol. 56 (1934), pp. 2752 and 2753.